Patented Mar. 30, 1948

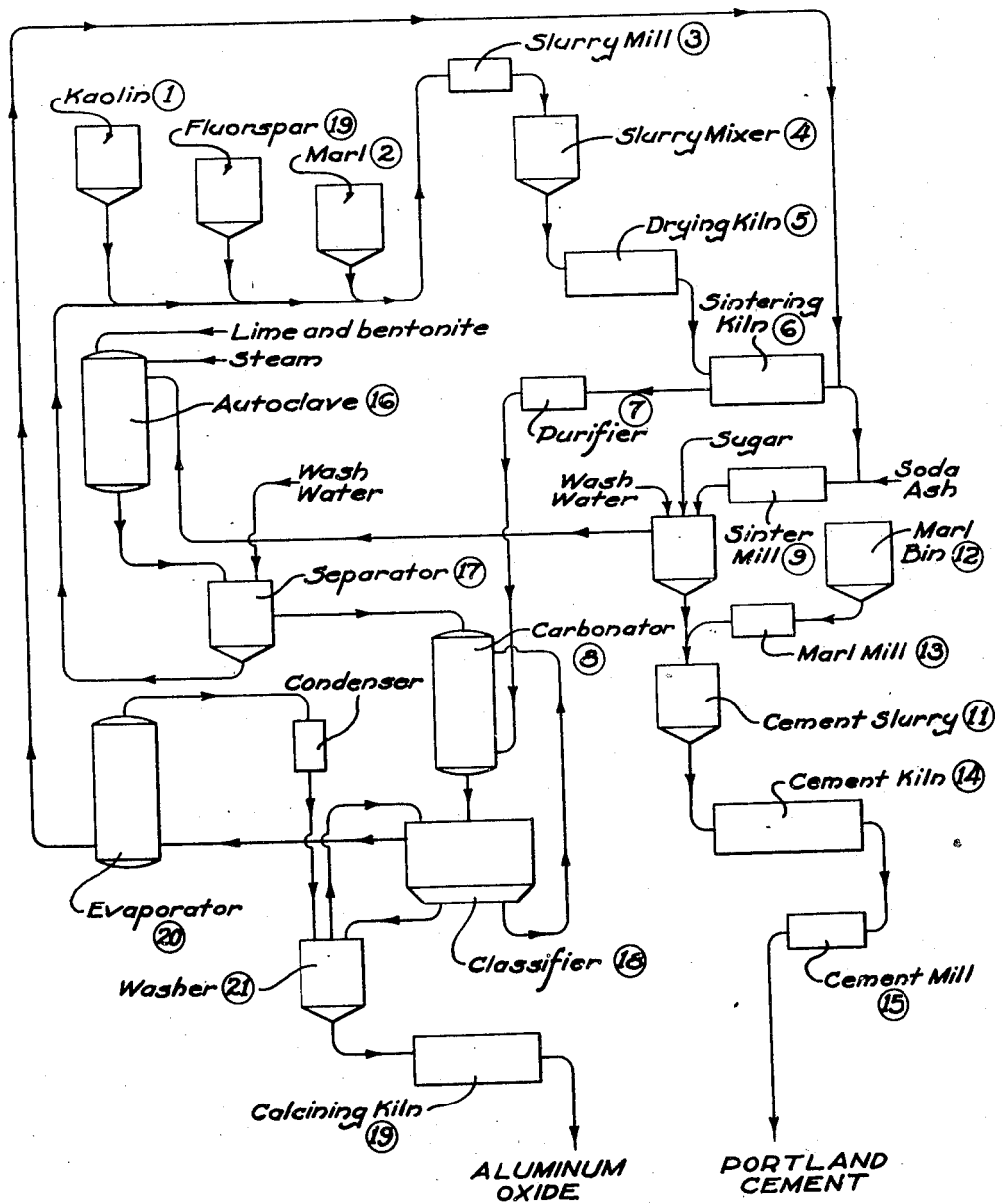

2,438,488

UNITED STATES PATENT OFFICE 2,438,488

PROCESS OF MAKING ALUMINA UTILIZING KAOLIN, MARL, AND RELATED MATERIALS

Frank J. Anderson and Duncan R. Williams, Laramie, Wyo., assignors to Monolith Portland Midwest Company, Laramie, Wyo., a corporation of Nevada Application June 22, 1943, Serial No. 491,778

3 Claims. (Cl. 23—141)

Our invention relates to a process by which kaolin, marl, and related materials may be converted into valuable products.

A great proportion of the crust of the earth consists of materials which are largely compounds of aluminum, calcium, and silicon, and which are commonly designated by names that describe their physical rather than their chemical characteristics. Large areas of what is commonly called waste land contain immense deposits of such materials, and since the land itself has very little value, the cost of such materials is largely the cost of digging and transporting such materials. These materials contain not only the valuable aluminum, calcium, and silicon in combination with each other and other elements, but they contain other materials, for example, iron salts, sodium and potassium compounds, and organic matter, and none of the components can be separated without expensive processing.

The object of our invention is to provide a process by which such materials can be economically converted into valuable products without preliminary purification.

Among related materials which may be treated by our process are nearly all naturally occurring minerals and mixtures of minerals containing silicon, aluminum, and calcium, such as the feldspars, particularly anorthosite, shales, clays, etc., and impure bauxite.

Our process will be better understood by inspection of a diagram illustrative of an assembly of apparatus such as used in a plant for practicing our invention. In this diagram we have not attempted to illustrate any details of the apparatus actually used by us, as each piece of apparatus so used is well known in the art and could be supplied and readily operated by any man skilled in the art after having read this specification.

The four principal elements of the products produced by the process are aluminum, calcium, sodium, and silicon. Silicon is found in minerals, not only as silica ($SiO_2$), but also in the form of the aluminum and other silicates. Aluminum may be present as aluminum oxide and hydroxide as well as aluminum silicate. Calcium may appear as carbonate, oxide, or hydroxide. In general, almost any combination of raw material that contains the necessary amounts of aluminum and calcium and which also contains silica or silicates can be used. We know that kaolin and marl make an excellent combination, but other combinations, such as the feldspars (for example, anorthosite) and limestone, can be used. In the following description, we shall confine ourselves to a discussion of a plant using kaolin and marl, since both are abundant and cheap and in combination work very well in our process.

Various mixtures of minerals which contain about the desired proportions of aluminum, calcium, and silicon may be used, and it is an essential advantage of our process that an exact mixture is not necessary to the success of our process for reasons that will be made evident hereinafter. It is also an advantage of our process that if the raw materials are mixed in very roughly the proper portions, there is very little waste material produced, and commercially salable products are produced.

Many materials may be used as the prime source of aluminum, and the kaolins are a cheap and abundant source of such material. In describing the operation of a typical plant, we shall assume that such a kaolin is used, an analysis of this kaolin which is more or less typical being:

|  | Per cent |
|---|---|
| $SiO_2$ | 45.8 |
| $Fe_2O_3$ | 0.4 |
| $Al_2O_3$ | 39.5 |
| Loss | 14.3 |

Under "loss" we include materials actually found in the kaolin which are of no value in, and which have no effect on, the process. The loss in the kaolin is largely chemically combined water.

To provide approximately the proper mix with the kaolin for producing the desired products, we may use limestone or any material high in calcium. In the plant to be hereinafter described, we would use a marl having the following analysis:

|  | Per cent |
|---|---|
| $SiO_2$ | 12.5 |
| $Fe_2O_3$ | 2.3 |
| $Al_2O_3$ | 2.3 |
| CaO | 45.0 |
| Loss | 37.9 |

In stating analyses herein, for convenience in chemical calculation, we list each of the metals, including silicon, as if it were present in the form of its oxide. As a matter of fact, it may be in the form of a hydroxide, carbonate, or other salt, or two metals may be united to form a double salt. The specific chemistry will be later discussed.

The loss in the marl is largely $CO_2$, since the calcium is present for the most part as a carbonate.

The above materials, kaolin and marl, are selected because large deposits of such materials are available, and we have definite data, which will be hereinafter referred to, as to the operation of a plant using these materials. Any competent chemist skilled in the art with the information given him herein could modify the process to suit other raw materials.

The raw materials, kaolin and marl, containing various impurities as noted, are mined usually by power shovels and, without attempt at more than a very crude classification, are broken up into convenient size for handling and dumped into storage bins 1 and 2. Fluorspar may be provided in the bin 1a. These materials are then passed in proper proportions to a slurry mill 3, where they are mixed with "barren" solution and ground. Sodium compounds are necessary to the operation of the process and are added in solution in what we term "barren solution." We shall later describe the source of this solution. In the operation of our plant producing 60 tons of alumina during each twenty-four hours, the following amounts of material will be passed to the slurry mill 3 during that period:

In the kaolin:

| | Tons |
|---|---|
| $SiO_2$ | 63.87 |
| $Fe_2O_3$ | 0.62 |
| $Al_2O_3$ | 55.17 |
| Loss | 19.93 |

In the marl:

| | Tons |
|---|---|
| $SiO_2$ | 65.10 |
| $Fe_2O_3$ | 11.97 |
| $Al_2O_3$ | 11.97 |
| CaO | 234.34 |
| Loss | 197.36 |

In the barren solution:

| | Tons |
|---|---|
| $Al_2O_3$ | 4.47 |
| $Na_2O$ | 49.55 |
| $SiO_2$ | .07 |
| $H_2O$ | 555.93 |

One of the advantages of our process is that the materials are mixed in a slurry, the composition of which can be easily determined and controlled. Such a slurry is also easily transported by means of pumps and piping.

The sodium in the barren solution is derived initially from soda ash supplied to the process, but during the operation of the process there is very little loss of sodium, and that recovered is reused. The raw slurry, however, must contain enough sodium to allow substantially all the aluminum present to combine with sodium to form sodium aluminate, allowing for small sodium losses. Operating on raw materials containing sodium, which is quite practical, the amount of soda supplied by the barren solution may be reduced, and in some cases where considerable sodium is present in the raw material, considerable sodium carbonate may be produced as a by-product of the process.

We find it desirable to also add fluorspar to the slurry in an amount equal to from ½ to 3% of the weight of the other dry material contained therein. This fluorspar acts as a flux or catalyst and assists the various reactions that occur in the process, particularly in the formation of dicalcium silicate. It is largely driven off in the sintering kiln, as hereinafter described. We find in the actual operation of the process that all the fluorine does not come out in the sintering kiln 6, and any fluorine remaining in the process at the point of calcination of the alumina at the calcining kiln 19 will be of assistance in lowering the silica content of the alumina, the silica being volatilized as silicon tetrafluoride ($SiF_4$). We find in the operation of the process that as much as ¼% fluorine remains in the process at the cement kiln 14, and it is helpful in volatilizing the alkalies from the cement clinker.

In our analyses given throughout the specification we give the amount of various metallic salts in terms of equivalent oxides and therefore do not distinguish between oxides, carbonates, or fluorides.

The ground slurry from the slurry mill 3 is proportioned to give a molecular ratio $$\frac{CaO}{SiO_2} = 1.9 \text{ to } 2.0$$

and $$\frac{Na_2O}{Al_2O_3} = 1.0 \text{ to } 1.3$$

and thoroughly mixed in a slurry mixer 4 and passed to a first drying kiln 5 and from the drying kiln 5 to a sintering kiln 6. The kiln 5 will receive during each twenty-four hours in the slurry:

| | Tons |
|---|---|
| $SiO_2$ | 130.10 |
| $Fe_2O_3$ | 12.59 |
| $Al_2O_3$ | 76.56 |
| CaO | 239.47 |
| $Na_2O$ | 52.56 |
| Loss | 217.29 |
| $H_2O$ | 560.66 |

Although the above analyses are given in terms of the oxides of the various elements for convenience in chemical calculation, it is to be understood that these oxides may not be present as such, as, for example, the aluminum and silicon may be combined as an aluminum silicate, and the calcium is present as a carbonate.

The mill 3 may be of any form suitable for grinding the slurry. In our plant the kilns 5 and 6 are rotary kilns internally fired, such as are used in cement manufacture. In the drying kiln 5 the uncombined water of the slurry is largely evaporated. An operator skilled in the operation of such kilns can so regulate the rate of feed, rotation, and firing that the material is delivered from the kiln 5 to the kiln 6 in a substantially dry state, without the adhesion of the materials to the walls of the kiln and without the formation of rings in the kiln. If rings so form, they will be in a very accessible location near the outlet end of the kiln. The operation of the kiln 6 must be carefully regulated as, while in the interest of economy it is desirable to use all the aluminum present to form sodium aluminate, if the material is held in the kiln for too long a period or the temperature is carried too high, a portion of the aluminum is converted into other products, such as sodium-aluminum silicate or aluminum silicate. At the proper temperature a sinter is formed which is largely free from glass and which is not slagged or melted into large masses. A typical analysis of this sinter is:

| | Per cent |
|---|---|
| $SiO_2$ | 25.47 |
| $Fe_2O_3$ | 2.46 |
| $Al_2O_3$ | 14.97 |
| CaO | 46.84 |
| $Na_2O$ | 10.28 | and each twenty-four hours we produce in the sinter:

| | Tons |
|---|---|
| SiO₂ | 130.10 |
| Fe₂O₃ | 12.59 |
| Al₂O₃ | 76.56 |
| CaO | 239.47 |
| Na₂O | 52.56 |

In these kilns 5 and 6 the aluminum silicate is substantially entirely converted into sodium aluminate, which is water-soluble, the silica combining with lime to form dicalcium silicate, which is water-insoluble. The 560.66 tons of water contained in the slurry is, of course, driven off largely in the first kiln 5. A hydrocarbon oil or gas or coal or coke is preferably used to fire these kilns, and the hot gases from the kiln 6, which are largely $CO_2$, are passed to a purifier 7 in which the products are cooled to condense steam and scrubbed to remove tar and solid matter, the $CO_2$ being then passed to a carbonator 8. By using two kilns and taking out the water from the slurry in the first kiln 5, the products of combustion from the second kiln do not contain the steam due to vaporization of the water of the slurry, and the purifier 7 does not have to handle as much steam as it would if the water of the slurry was passed as steam into the purifier 7.

The sinter from the kiln 6 is passed to a sinter mill 9, where the sinter is ground to pass through a 60-mesh screen and wet with barren solution, which each twenty-four hours supplies the following amounts of material:

| | Tons |
|---|---|
| SiO₂ | 0.02 |
| Al₂O₃ | 1.51 |
| Na₂O | 16.76 |
| H₂O | 233.07 |

It is important that enough sodium be added at this point to enable a stable sodium aluminate solution to be produced. In fact, enough sodium should be added to produce a mol ratio of not less than $$\frac{Na_2O}{Al_2O_3} = 1.5$$

and it can be as much as 1.9. Unless there is excess sodium in the solution which is then formed, alumina will precipitate from the solution and be carried into the cement, as will be understood after the remainder of the process has been described. The sodium can, of course, be derived from the barren solution, but, since it is often necessary to add sodium to make up for losses, the soda ash or other soda compound necessary for this purpose can be conveniently added at this point.

We have found, however, that if the sinter from the kiln 6 is simply mixed with water or even a solution in which an excess of sodium is present, a gel is produced which resists the leaching step which follows. We therefore add to the sinter from 0.2 to 2% of its weight of a suitable sugar, such, for example, as molasses or corn syrup. This prevents the sodium aluminate from gelling and enables the leaching step to be conducted as will be now described.

Soda ash or other soda compound during each twenty-four hours supplies the following material to the sinter mill 9:

| | Tons |
|---|---|
| Na₂O | 4.31 |
| Loss | 3.13 |

The slurry from the sinter mill 9 passes to a leacher 10. This is shown in the diagram as a simple tank, but in the actual plant it is a series of agitators and settlers adapted to mix water with the slurry, to dissolve from the slurry nearly all its water-soluble components, and to deliver the solid insoluble residue to a cement slurry tank 11. A typical residue analysis would be:

| | Per cent |
|---|---|
| SiO₂ | 32.60 |
| Fe₂O₃ | 1.80 |
| Al₂O₃ | 3.20 |
| CaO | 60.50 |
| Na₂O | 1.10 |
| Loss | 0.80 | and there should be delivered to the cement slurry tank 11 each twenty-four hours:

| | Tons |
|---|---|
| SiO₂ | 128.93 |
| Fe₂O₃ | 12.59 |
| Al₂O₃ | 7.33 |
| CaO | 239.47 |
| Na₂O | 4.15 |
| Loss | 3.13 |
| H₂O | 233.07 |

This residue is too high in silica and too low in calcium to make good Portland cement, the silica and calcium being present as dicalcium silicate, and tricalcium silicate being desired in cement manufacture. We therefore add 462.06 tons of marl to the cement slurry tank 11 during each twenty-four hours. This marl is delivered from a marl bin 12 through a marl mill 13 to the cement slurry tank 11. The marl used by us has an analysis as follows:

| | Per cent |
|---|---|
| SiO₂ | 12.5 |
| Fe₂O₃ | 2.3 |
| Al₂O₃ | 2.3 |
| CaO | 45.0 |
| Loss | 37.9 |

The slurry formed from the residue from the leacher 10 and the marl from the mill 13 is a good Portland cement mix, and after being burned in a cement kiln 14 and ground in a clinker mill 15 forms an excellent Portland cement notably low in alumina. The plant which has been discussed will produce about 3600 barrels of this cement each twenty-four hours.

The solution extracted by the leacher 10 is largely sodium aluminate carrying some silica or silicates. The sugar is still carried in solution and prevents premature setting or gelling. In each twenty-four hours the following amounts of material should pass from the leacher 10 to an autoclave 16:

| | Tons |
|---|---|
| SiO₂ | 1.19 |
| Al₂O₃ | 70.74 |
| Na₂O | 69.48 |
| H₂O | 962.07 |

It will be noted that the percentage of silica carried in this solution is low, but it is still too high for our purpose. We therefore subject the extracted solution, to which slaked lime has been added, to digestion in the autoclave 16. We need enough $Ca(OH)_2$ per twenty-four hours to provide 5.13 tons of CaO for this purpose. We find that it is desirable that the lime be freshly burned and freshly slaked. The autoclave is supplied with steam at 100 pounds pressure and maintained at that pressure and at the temperature of steam at that pressure for a period of at least one hour. There is an excess of lime in the form of Ca(OH)$_2$ in the autoclave. It is only slightly soluble, and the remainder is in suspension. The principal result of the autoclave operation is to convert the silica into insoluble compounds, notably calcium silicate. It is of advantage to add to the material in the autoclave 16 an amount of bentonite about equal to the amount of lime used, this bentonite acting to adsorb and collect fine particles of silica, which are retained in the bentonite when it is separated in a separator 17. After autoclaving, the solution is passed to the separator 17, where insoluble residues are extracted and then returned to the slurry mill 3. In the separator 17, 4.73 tons of wash water are added during each twenty-four hours, and the desilicated solution is passed to the carbonator 8. We pass to the carbonator each twenty-four hours:

| | Tons |
|---|---|
| Al$_2$O$_3$ | 65.79 |
| Na$_2$O | 66.47 |
| SiO$_2$ | .13 |
| H$_2$O | 962.07 |

The soda and alumina are present in the solution passing to the carbonator 8 as a sodium aluminate carried in an alkali solution containing a sugar.

In the carbonator 8 carbon dioxide gas derived from the second sintering kiln 6 and purified in the purifier is bubbled through the solution and thoroughly mixed therewith. We so use 44.48 tons of CO$_2$ each twenty-four hours. The carbonation converts the sodium aluminate into water-soluble sodium carbonate and water-insoluble aluminum hydrate. We have found that if the carbonation is carried too far, silica is precipitated from the solution, and we prefer to carbonate only from 60 to 90% of the aluminum out of the solution. This can be regulated by observing the hydrogen ion concentration in the carbonator and stopping the carbonation when the pH is reduced to about 13. From the carbonator 8 the solution carrying suspended solids is passed to a classifier 18. In the classifier the barren solution is separated from the solid residue, and the solid residue is separated into fine particles or seed, which is sent back to the solution flowing to the carbonator, and coarse particles, which are sent to a washer 21. These coarse particles still carry water, and there are substances in solution in the water which we do not desire in our final product. It is therefore necessary to thoroughly wash the solid residue of the classifier 18, which is done with distilled water in the washer 21, this water being condensate from an evaporator 20. The wash water with dissolved impurities is sent back to the classifier 18 from the washer 21. In plant operation we use 277.2 tons of this wash water every twenty-four hours. The thoroughly washed material, which is almost wholly aluminum hydrate, is then sent to a calcining kiln 19. In this kiln the hydrate is changed to aluminum oxide, and about 60 tons of such oxide are produced during each twenty-four hours. A typical analysis of this product may show the following impurities:

| | Per cent |
|---|---|
| SiO$_2$ | .029 |
| Fe$_2$O$_3$ | .015 |
| TiO$_2$ | .010 |
| K$_2$O | .020 |
| Na$_2$O | .300 |
| CaO | .015 |
| MgO | .008 |

These impurities are, of course, carried into the process by the raw materials. Since we do not attempt to purify the raw materials used, and the amount of these impurities is within commercial limits, we have not attempted to find their source. An aluminum oxide containing such small quantities of impurities is a valuable product, as it is a metallurgical alumina which is in great demand.

The solution from the classifier is evaporated in the evaporator 20, 409 tons of water being evaporated each twenty-four hours. This evaporation is desirable to increase the percentage of Na$_2$O in the barren solution to a point that will enable slurry of the proper consistency to be formed in the mills 3 and 9. The sodium of the barren solution, although given in the analyses as Na$_2$O, as it leaves the evaporator is in the form of carbonate and aluminate, but it loses its CO$_2$ in the kilns 5 and 6.

It will be noted that the plant operates at low cost and may utilize kaolin, marl, shale, or other minerals without preliminary purification, and that substantially all the low cost raw material used is converted either to aluminum oxide or Portland cement. There is little or none of the waste removal problem so commonly found in plants of this general character. It will further be noted that, although soda ash or other soda compound must be initially supplied to provide the sodium needed for the operation of the process, this sodium is recovered and reused, and the loss in sodium is small, and therefore only those small amounts must be supplied which are necessary to provide for losses.

The chemistry of this process may be described briefly as follows:

The raw materials used in the particular example of the process discussed, for example, marl and kaolin, contain aluminum, silicon, and calcium, but are relatively free of potassium and sodium. By adding barren solution containing the necessary sodium to the slurry in the slurry mixer 4, a slurry is produced which when burned in the kilns 5 and 6 will cause the alkali, which in the example given above is sodium carbonate, to unite with substantially all the aluminum to form water-soluble sodium aluminate, which is leached out of the insoluble residue in the leacher 10. This residue will not make a satisfactory cement, but when enriched with marl or other raw material high in calcium produces a slurry which when burned in the kiln 14 and ground in the mill 15 does produce a very good cement which is notably low in aluminum.

The sodium aluminate solution from the leacher 10 is not a good raw material for the production of aluminum oxide, since it carries considerable amounts of silica. By adding lime and bentonite to this solution and treating it in the autoclave 16, this silica becomes calcium silicate which may be separated from the solution and sent back to the slurry mill 3 or the slurry tank 4.

The solution of sodium aluminate from the autoclave is then passed to the carbonator 8, where the greater portion of it is converted to aluminum hydrate and sodium carbonate. In the classifier 18, fine particles of aluminum hydrate are separated from the solution and sent back to the carbonator to act as nuclei for aluminum hydrate formation. The residue is then washed and calcined in the kiln 19. The sodium carbonate solution is then evaporated in the evaporator 20 to produce a "barren" solution of sodium carbonate and sodium aluminate ordinarily containing enough sodium to supply the needs of the process.

The above process has the advantage that very low cost raw materials are used, and very little of even these materials is wasted, substantially all of them being converted into valuable aluminum oxide and Portland cement. The process is practiced in apparatus such as used in the manufacture of Portland cement, which is easily operated by unskilled labor without onerous supervision. By our process kaolin and marl may be used to produce aluminum oxide suitable for use in the production of the metal aluminum, which is now so greatly in demand, and as to which there is a shortage due to lack of high grade bauxite. By using the process as described to produce aluminum oxide and Portland cement simultaneously, both can be produced at low cost.

The process may not only be used on raw materials such as kaolin and marl or feldspar and shale, but in fact on many other materials containing calcium, aluminum, and silicon. If the raw materials contain sodium or potassium in considerable amounts, it may be economical to produce potash or soda as a by-product of the process by evaporation of excess barren solution.

The process can be used to produce the oxides of beryllium, titanium, and vanadium, as well as aluminum oxide, as these metals act just as aluminum does in the process, or it may be used on a raw material containing two or more of these metals and producing a mixed oxide, that is a mixture of aluminum and beryllium oxide, for example. The separation of such oxides into their component parts is well understood.

We claim as our invention:

1. The process of producing aluminum hydroxide from a sinter which is predominantly insoluble calcium silicate and soluble sodium aluminate and which has a mole ratio of CaO to SiO₂ between 1.9 and 2 and a mole ratio of Na₂O to Al₂O₃ between 1.0 and 1.3, which process comprises, adding sufficient sodium carbonate to said sinter to provide a mole ratio of Na₂O to Al₂O₃ between 1.5 and 1.9 and wet grinding said sinter, leaching the ground sinter in the presence of soluble sugar in an amount between 0.2 and 2% of the weight of said sinter to produce a sodium aluminate solution, separating the sodium aluminate solution containing said sugar and sodium carbonate from the resulting insoluble residue, treating said solution with carbon dioxide to precipitate aluminum hydroxide and separating said aluminum hydroxide from the remaining sodium carbonate solution.

2. The process of producing aluminum hydroxide, which comprises, forming a sinter which is predominantly insoluble calcium silicate and soluble sodium aluminate and which has a mole ratio of CaO to SiO₂ between 1.9 and 2 and a mole ratio of Na₂O to Al₂O₃ between 1.0 and 1.3, adding sufficient sodium carbonate to said sinter to provide a mole ratio of Na₂O to Al₂O₃ between 1.5 and 1.9 and wet grinding said sinter, leaching the ground sinter in the presence of soluble sugar in an amount between 0.2 and 2% of the weight of said sinter to produce a sodium aluminate solution, separating the sodium aluminate solution containing said sugar and sodium carbonate from the resulting insoluble residue, removing residual silicates from said solution by treating said solution with an excess of lime over that required to combine with said residual silicates, and separating the resulting precipitate from the remaining solution, treating the remaining solution with carbon dioxide to precipitate aluminum hydroxide and separating said aluminum hydroxide from the remaining sodium carbonate solution.

3. In a process for making Portland cement low in alumina content and for recovering commercially pure alumina from raw materials one of which is predominantly aluminous silicious material and the other of which is predominantly calcium carbonate, the steps which comprise, forming a mixture of said raw materials and an amount of calcium fluoride between ½ and 3% of the weight of said raw materials to provide a mole ratio of CaO to SiO₂ between 1.9 and 2, a wet grinding said mixture to form a slurry which is subsequently dried and sintered, adding sufficient sodium carbonate to the mixture before it is sintered to provide a mole ratio of Na₂O to Al₂O₃ between 1.0 and 1.3, sintering the resulting mixture to drive off carbon dioxide and provide a sinter which is predominantly sodium aluminate and calcium silicate, adding sufficient sodium carbonate to said sinter to provide a mole ratio of Na₂O to SiO₂ between 1.5 and 1.9 and wet grinding said sinter, leaching said ground sinter in the presence of soluble sugar in an amount between 0.2 and 2% of the weight of said sinter to produce a sodium aluminate solution containing said sodium carbonate and said sugar and leave a residue which is predominantly calcium silicate suitable for cement manufacture, treating said solution with lime and clay to remove residual silicates and then with carbon dioxide to precipitate aluminum hydrate, separating said precipitated aluminum hydrate from the remaining solution and converting the same to alumina.

FRANK J. ANDERSON.
DUNCAN R. WILLIAMS.

REFERENCES CITED

The following references are of record in the file of this patent:

UNITED STATES PATENTS

| Number | Name | Date |
| --- | --- | --- |
| 46,979 | Ward | Mar. 21, 1865 |
| 941,799 | McCullouch | Nov. 30, 1909 |
| 1,137,860 | Howard | May 4, 1915 |
| 1,320,172 | Pontoppidan | Oct. 28, 1919 |
| 1,964,685 | Folger | June 26, 1934 |
| 2,242,258 | Noll | May 20, 1941 |

FOREIGN PATENTS

| Number | Country | Date |
| --- | --- | --- |
| 499,855 | Great Britain | 1937 |